United States Patent [19]

Nishimura et al.

[11] Patent Number: 4,651,081
[45] Date of Patent: Mar. 17, 1987

[54] CONTROL APPARATUS FOR VEHICULAR CHARGING GENERATOR

[75] Inventors: Shinji Nishimura; Hifumi Wada; Keiichi Komurasaki, all of Himeji, Japan

[73] Assignee: Mitsubishi Denki Kabushiki Kaisha, Tokyo, Japan

[21] Appl. No.: 826,875

[22] Filed: Feb. 6, 1986

[30] Foreign Application Priority Data

| Feb. 25, 1985 | [JP] | Japan | 60-35838 |
| Mar. 1, 1985 | [JP] | Japan | 60-41449 |
| Mar. 1, 1985 | [JP] | Japan | 60-41450 |
| Mar. 4, 1985 | [JP] | Japan | 60-43964 |
| Mar. 4, 1985 | [JP] | Japan | 60-43965 |

[51] Int. Cl.$^4$ ............................................. H02J 7/04
[52] U.S. Cl. ........................................ 320/64; 320/30; 320/31; 320/32; 320/39; 322/29; 322/14; 322/38; 322/59; 123/339
[58] Field of Search ................. 322/29, 14, 15, 28, 322/38, 59; 123/339; 320/64, 30, 31, 32, 39, 40

[56] References Cited

U.S. PATENT DOCUMENTS

| 4,322,630 | 3/1982 | Mezera | 290/40 C |
| 4,553,516 | 11/1985 | Hasegawa | 123/339 |

FOREIGN PATENT DOCUMENTS 57-65230  4/1982  Japan.

*Primary Examiner*—Patrick R. Salce
*Assistant Examiner*—Mark D. Simpson
*Attorney, Agent, or Firm*—Leydig, Voit & Mayer

[57] ABSTRACT

A control apparatus for a vehicular charging generator utilizing various sensors which detect an unstable rotation during the starting of an engine, the acceleration/deceleration condition of the engine, an overload condition of the engine etc. to regulate the output voltage of the generator by a micro-computer, whereby the rotation of the engine is stabilized and the acceleration performance is enhanced due to a reduction of the load of the generator while and over-discharge of the battery is effectively compensated. Also, various abnormal conditions are detected by the sensors and indicated.

10 Claims, 13 Drawing Figures

CONTROL APPARATUS FOR VEHICULAR CHARGING GENERATOR

BACKGROUND OF THE INVENTION

This invention relates to a control apparatus for a vehicular battery-charging generator, and in particular to an apparatus for regulating the output voltage of a vehicular battery charging generator by controlling current flowing through the field coil of the charging generator.

This kind of a prior art vehicular charging generator from which this invention starts is shown in FIG. 1 wherein a generator 1 driven by an engine mounted on a vehicle (not shown) includes an armature coil 11, a field coil 12, a rectifier 13 which full-wave rectifies a three-phase alternating current generated from the armature coil 11 to provide a main output, and a rectifier 14 which is connected in parallel with the rectifier 13 and full-wave rectifies the main DC output of the rectifier 13 to provide a so-called "trio-voltage" output as an auxiliary DC output.

A voltage regulator 10 for regulating the main output voltage of the generator 1 to a predetermined value includes a power transistor 10a for controlling the field current of the field coil 12, a base resistor 10b disposed in the base circuit of the power transistor 10a, a transistor 10c for switchably controlling the power transistor 10a, voltage dividing resistors 10d and 10e serially connected to the trio-voltage output of the rectifier 14, a zener diode 10f as a voltage detecting device, for detecting the trio-voltage output of the rectifier 14, energized when the output voltage reaches or exceeds another predetermined value related to the above predetermined value, and a diode 10g as a surge absorber connected across the field coil 12. A battery 2 is connected across the rectifier 13 through a main conductor or wire 5 and charged by the generator 1 through the rectifier 13. An electrical load 3 for a vehicle is supplied with an electrical power from the generator 1 and the battery 2. A key switch 4 and a pilot lamp 20 for indicating "non-generation" state are serially connected to each other between the battery 2 and the regulator 10.

In operation, upon closing the key switch 4, a closed loop from the positive pole of the battery 2 through the key switch 4, the pilot lamp 20, the field coil 12, and the power transistor 10a to the negative pole of the battery 2 is formed whereby the field current is supplied for the field coil 12 of the generator 1 and simultaneously the pilot lamp 20 is lighted to indicate the "non-generation" state. In this state, when the engine is started, the generator 1 is driven to cause the rectifiers 13 and 14 to provide the respective output voltages corresponding to the rotational speed of the engine. As the output voltages of the recitifiers 13 and 14 approaches the terminal voltage of the battery 2 respectively, the voltage across the pilot lamp 20 decreases whereby the pilot lamp 20 is put out, oppositely indicating the fact that the generator 1 is under its normal operation i.e. power generation.

While the output voltages of the rectifiers 13 and 14 are lower than the predetermined value, that is the junction voltage of the voltage dividing resistors 10d and 10e is still lower than the above noted another predetermined voltage, the zener diode 10f is held to be non-conductive. As the rotational speed of the engine further increases and therefore the output voltages of the rectifiers 13 and 14 of the generator 1 become higher than the predetermined value, the junction voltage of the resistors 10d and 10e increases accordingly so that the zener diode 10f becomes now conductive, whereby a base current flows in the transistor 10c and through the zener diode 10f to make the transistor 10c conductive. In response to this, the power transistor 10a becomes non-conductive, thereby interrupting the field current of the field coil 12 to eliminate the output voltage of the generator 1.

When the output voltage of the generator 1 becomes lower than the predetermined voltage, the zener diodes 10f and the transistor 10c become non-conductive again so that the power transistor 10a is made conductive, which causes the field current in the field coil 12 to increase the output voltage of the generator 1 again. By the repetition of these operations, the output voltage of the generator 1 is regulated to the predetermined value which is typically about 14V.

In a prior art apparatus thus constructed, the generator 1 continues to hold a predetermined output voltage regardless of whether the vehicle is in its acceleration state or its deceleration state so that the engine is almost always loaded with the driving torque of the generator 1. Therefore, such a prior art apparatus is disadvantageous in that the acceleration/deceleration performance of the engine is worsened.

Moreover, although the power generator by the generator 1 is stopped to reduce the load on the engine during an unstable state such as the start of the engine, the battery 2 supplies an electrical power to various electrical loads during the stoppage of the power generation, and therefore the battery 2 may be over-discharged.

Furthermore, the pilot lamp 20 is inserted into a lighting circuit including the filed coil 12 and the power transistor 10a, so that the lighting circuit is not activated when the field coil 12 is disconnected or the power transistor 10a is broken, with the disadvantageous result that the pilot lamp 20 is not lighted even in the non-generation state.

On the other hand, Japanese Patent Application Laid-open No. 57-65230 discloses a control apparatus for a vehicular battery charging generator in which the rotational speed of the charging generator is detected to control the field current of the charging generator. Specifically, the rotational speed as detected is differentiated, and when the differentiated speed is higher than a positive predetermined value, the field current is reduced while when the differentiated speed is lower than a negative predetermined value, the field current is increased.

SUMMARY OF THE INVENTION

It is an object of the present invention to provide a control apparatus for a vehicular charging generator wherein in an abnormally low speed of an engine such as an idling condition of an engine or in an acceleration condition of an engine, the field current of the generator is controlled to reduce the output voltage of the generator to eliminate the driving torque of the generator whereby the rotation of the engine is stabilized or the acceleration performance is enhanced, and wherein after the engine has returned to its normal rotational speed or after the acceleration has completed, the required output voltage of the generator is temporarily increased. thereby rapidly charging the battery to rapidly recover the battery voltage.

It is another object of the present invention to provide a control apparatus for a vehicular charging generator wherein in a deceleration state of an engine, the output voltage of the generator is increased to more quickly charge the battery, whereby the driving torque of the generator is increased to enhance the braking performance of the vehicle.

It is still another object of the present invention to provide a control apparatus for a vehicular charging generator wherein a discharging state of a battery which is in an overloaded state is detected and the regulated voltage of the generator is held to a normally regulated voltage thereof during the discharging condition and is then temporarily increased after having returned to a normal load condition of an engine in order to rapidly charge the battery, thereby rapidly recovering the battery voltage.

It is a further object of the present invention to provide a control apparatus for a vehicular charging generator wherein various abnormal conditions are detected to provide the corresponding alarms for a driver.

These objects are achieved by the provision of an engine speed sensor, a throttle opening sensor, a battery voltage sensor and a trio-voltage sensor, and of a micro-computer as a control means for determining an acceleration state, an idling state and a battery discharging state of the vehicle from the outputs of those sensors to control the field current of the charging generator so that these states may be favorably utilized to control the charging times as well as charging rate of the battery. Also, there is provided an alarm portion driven by the output of the control means, whereby the non-generation state or the non-controlled state of the generator, or an abnormal state such as the disconnection of a main wire between the generation and the battery is indicated.

DETAILED DESCRIPTION OF THE PREFERRED EMBODIMENTS

Figure 1:
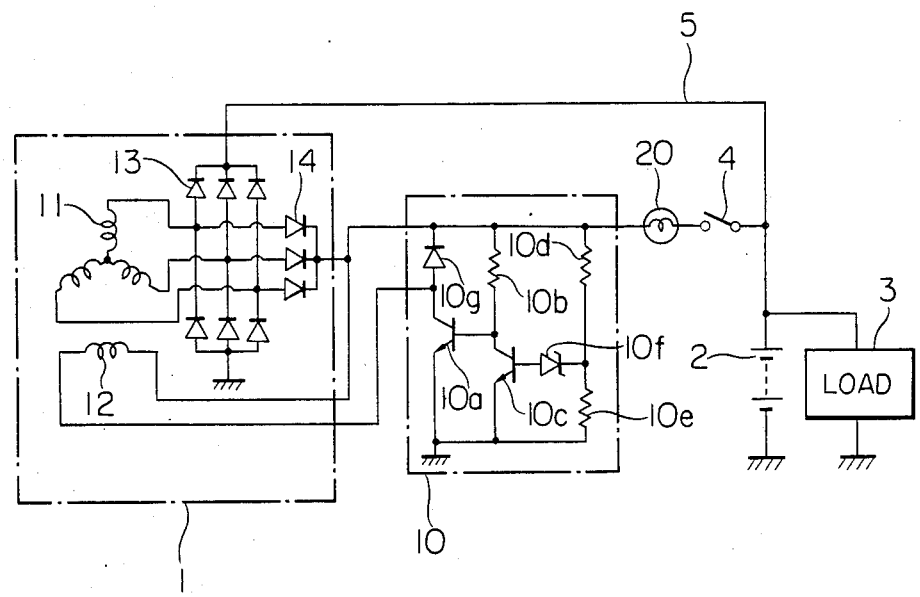
FIG. 1 shows a circuit diagram of an essential portion of a conventional control apparatus for a vehicular charging generator.

There will be now described in detail the present invention with reference to the preferred embodiments thereof shown in the accompanying drawings as noted above. It is to be noted that the same reference numerals as indicated in FIG. 1 denote identical or corresponding elements so that the same descriptions will not be repeated herebelow.

Figure 2:
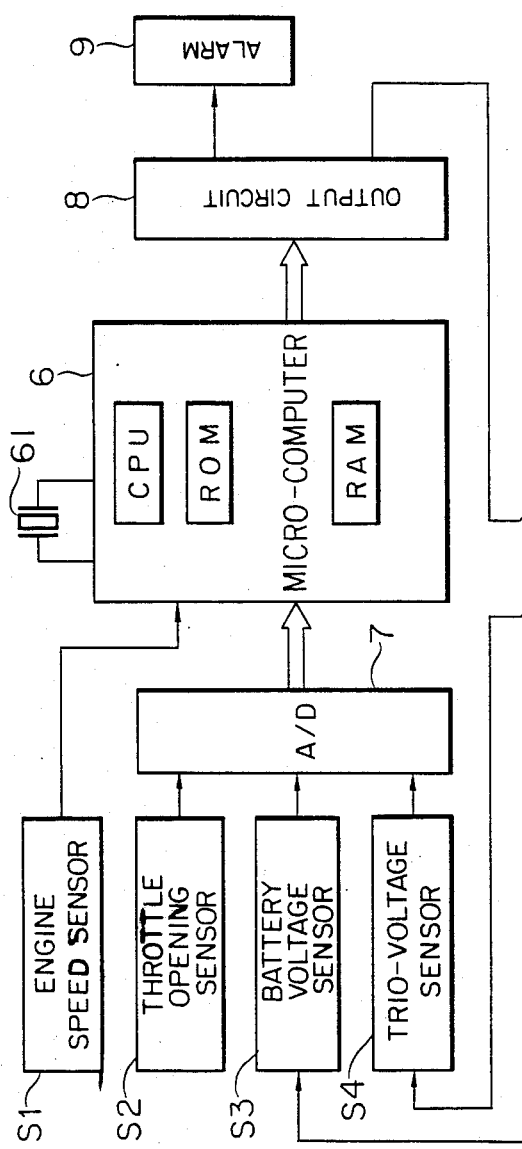
FIG. 2 shows an arrangement diagram of a control apparatus for a vehicular charging generator in accordance with one embodiment of the present invention.
Figure 3:
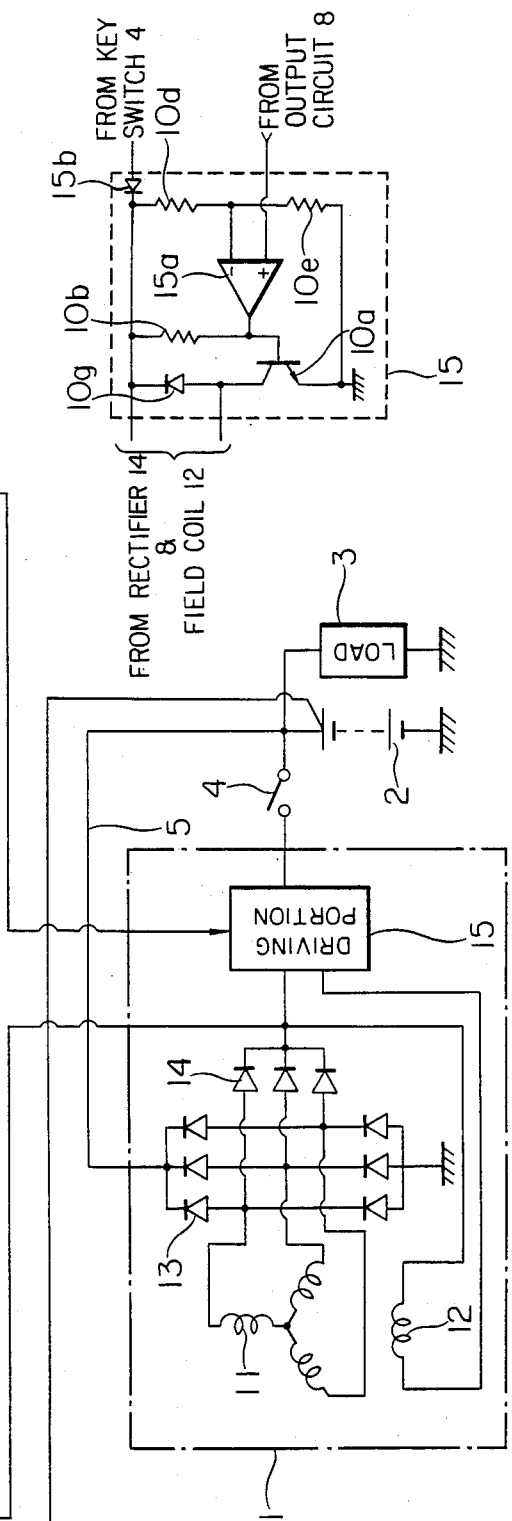
FIG. 3 shows a circuit diagram of a driving portion used and shown in FIG. 2.

In FIG. 2, a driving portion 15 is mounted on the generator 1 to drive or energize the field coil 12. This driving portion 15 is arranged, for example as shown in FIG. 3, as a substitution for the combination of the transistor 10c and the zener diode 10f in FIG. 1, and comprises a comparator 15a which compares a junction voltage divided by the resistors 10d and 10e with the output voltage of an output circuit 8 which will be described later, and a diode 15b for initially exciting the field coil 12. Therefore, the power transistor 10a is controlled according to the output of the output circuit 8. Namely, when the non-inverting input of the comparator 15a is equal to or lower in level than the inverting input, the transistor 10a is not switched on, so that no field current is provided for the field coil 12. When the non-inverting input of the comparator 15a is higher in level than the inverting input, the transistor 10a has a base current according to the output level of the comparator 15a corresponding to the voltage level of the non-inverting input of the comparator 15a so that the field coil 12 has the corresponding current flowing therethrough. A micro-computer 6 is formed of a Large Scale Integrated circuit of a one-chip type which essentially comprises a ROM having stored therein a program defining the process of various arithmetic operations, a CPU for sequentially reading out the program of the ROM and executing the corresponding operations, a RAM including various status registers for temporarily storing various data with regard to the operations of the CPU, and a clock generation portion associated with an oscillator 61 for generating reference clock pulses for various arithmetic operations. This micro-computer 6 is operated by the supply of a regulated power source through a regulated power source circuit (not shown) from the battery 2 upon the closure of the key switch 4.

In order to carry out the control by the micro-computer 6 in accordance with this invention, there are provided at least four sensors. An engine speed sensor S1 detects the rotational speed of an engine from ignition signals and provides its output to the micro-computer 6 to calculate the speed of the engine. A throttle opening sensor S2 converts the opening degree of the throttle of the engine into a voltage value by using a variable resistor. A battery voltage sensor S3 detects the voltage value of the battery 2. A trio-voltage sensor S4 detects the voltage value of the trio-voltage output of the generator 1.

An analog-digital (A/D) converter 7 converts the analog output signals of the throttle opening sensor S2, the battery voltage sensor S3 and the trio-voltage sensor S4 respectively into digital signals which are input into the micro-computer 6. The output signal of the micro-computer 6 is fed to the alarm portion 9 for generating various alarms as well as the driving portion 15 through the output circuit 8 as mentioned above which carries out an impedance conversion.

In operation, upon the closure of the key switch 4 shown in FIG. 2, the micro-computer 6, the A/D converter 7, the output circuit 8, the alarm portion 9 and the driving portion 15 are energized through the regulated power source circuit (not shown), whereby the program stored in the ROM of the micro-computer 6 begins to be executed. The field coil 12 of the generator 1 is subject to the initial excitation from the battery 2 through the driving portion 15 and the key switch 4, so that when the generator 1 is driven by the engine mounted on a vehicle, the generator 1 can generate an electrical power.

Hereinafter, the operation of the control apparatus shown in FIG. 2 will be described with reference to flow charts shown in FIGS. 4–12.

Figure 4:
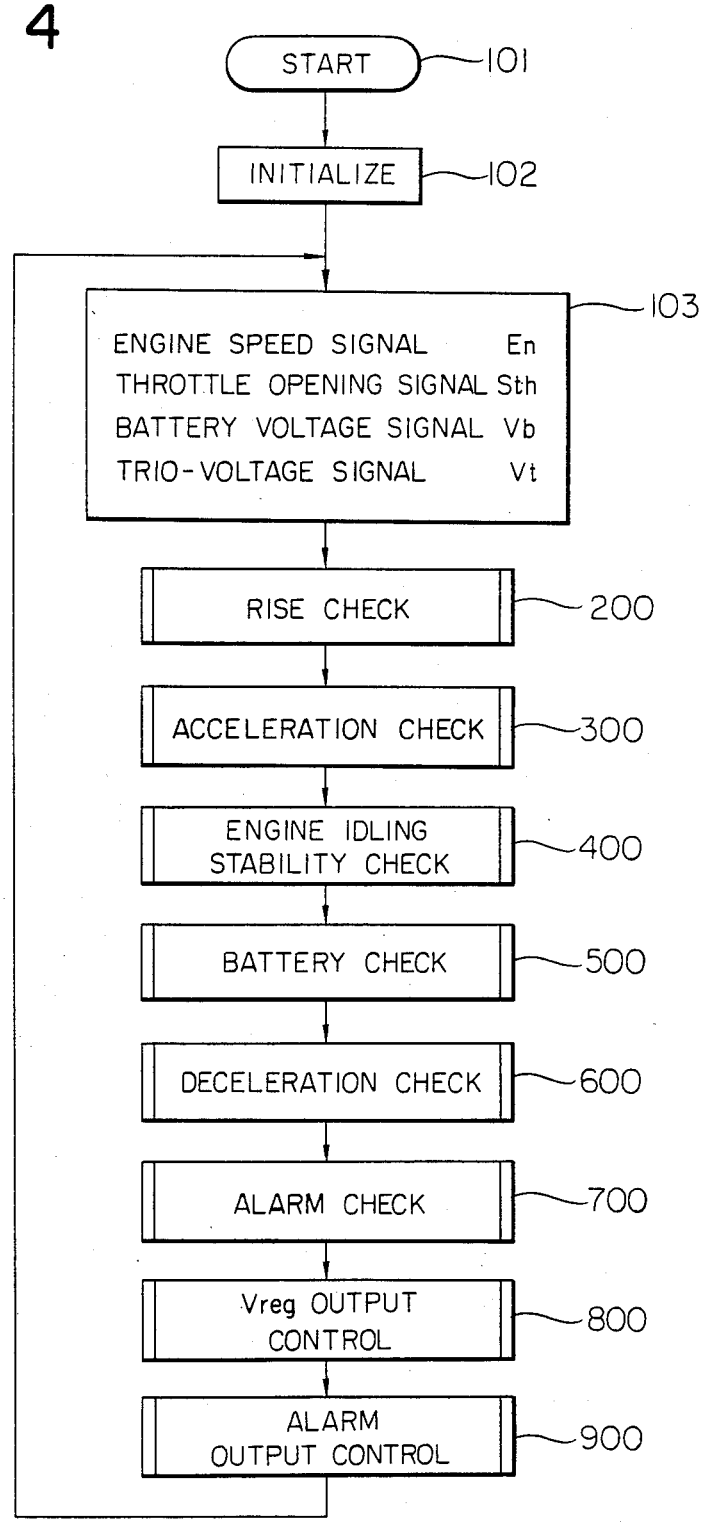
FIG. 4 shows a general flow chart of a program executed by a micro-computer shown in FIG. 2.

In FIG. 4, at Step 101 the operation processing of the program is started, at Step 102 the registers in the RAM are initialized, and the program proceeds to Step 103 at which an engine speed signal En from the engine speed sensor S1, a throttle opening signal Sth from the throttle opening sensor S2, a battery voltage signal Vb from the battery voltage sensor S3, and a trio-voltage signal Vt from the trio-voltage sensor S4 are respectively read in and temporarily stored in the RAM. Then, the program proceeds to a rise checking Step 200 at which the engine speed signal En and the trio-voltage signal Vt are checked as to whether or not the engine is started and the generator 1 has started to generate the electrical power. If those answers are "YES", then the program proceeds to Step 300 at which the throttle opening signal Sth is checked as to whether or not the vehicle is in the acceleration condition. After the completion of Step 300, the program proceeds to an engine idling stability checking Step 400 at which the engine speed signal En is checked as to whether or not the idling speed of the engine is stable. Then, the program proceeds to Step 500 at which the battery voltage signal Vb is checked on the basis of the voltage value of the battery 2 as to whether or not the battery 2 is in the discharging mode. Then, the program proceeds to a deceleration checking Step 600 at which the throttle opening signal Sth and the engine speed signal En are checked as to whether or not the vehicle is being decelerated. Then, the program proceeds to an alarm checking Step 700 at which the battery voltage signal Vb and the trio-voltage signal Vt are checked as to whether or not the battery charging system of the vehicle is normally operating. Then, the program proceeds to a Vreg output control routine 800 at which the status of the registers in the RAM concerning the regulated output voltage of the generator 1 in the respective routines 200–700 are totally checked to determine the output voltage of the generator 1 to be provided for the output circuit 8. Then, the program proceeds to an alarm output control Step 900 at which the status of the registers in the RAM concerning the abnormal condition of the battery charging system in the respective routines of Steps 200–700 are totally checked to determine the output to the alarm portion 9 to be provided for the output circuit 8. Then, the program proceeds to Step 103 for reading in various input information as above described, and this routine is repeated.

The details of the routines of Steps 200–900 will now be described respectively.

Figure 5:
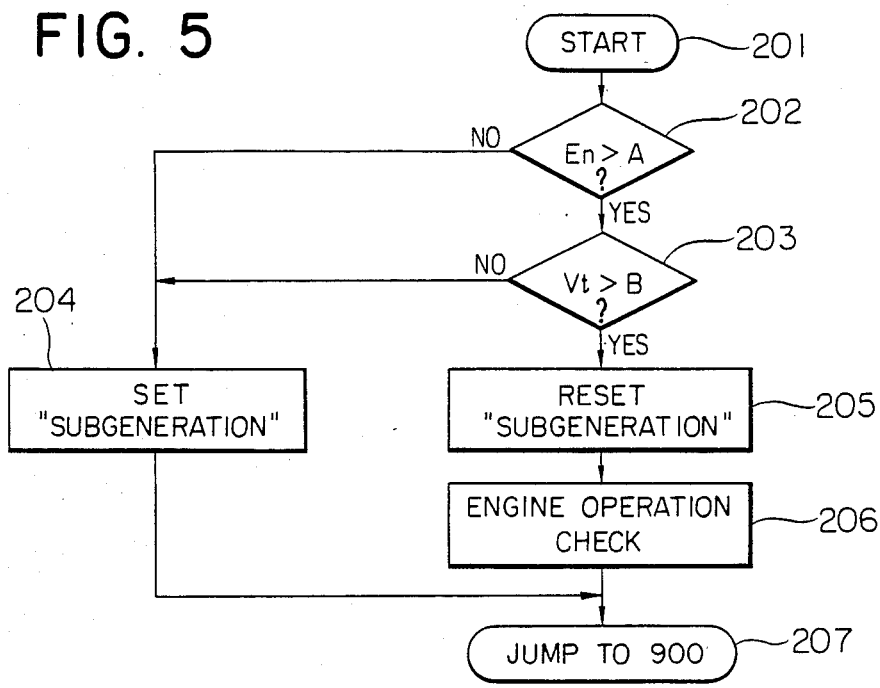
FIG. 5 shows a flow chart of a rise checking routine in the general flow chart shown in FIG. 4.

First of all, the rise checking Step 200 will be described with reference to FIG. 5. The program proceeds from Step 201 to an engine speed checking Step 202 and a trio-voltage checking Step 203. At Step 202, if the engine speed En exceeds a predetermined speed A, it is determined that the engine has started, and then at Step 203, if the trio-voltage output Vt of the generator 1 exceeds a predetermined voltage value B, it is determined that the generator 1 has started to generate electrical power. If the answer at either of these Steps 202 and 203 is "NO", it is determined that the engine and the generator 1 have not yet started operating so that at Step 204, a "subgeneration" indication is set, that is temporarily stored by setting a corresponding status register in the RAM. Then, at Step 207, the program jumps to the alarm output control Step 900 shown in FIG. 4. At this time, the regulated voltage value of the driving portion 15 of the generator 1 is assumed to have a basic regulated value Vs which is typically about 14V.

On the other hand, if the answers in Steps 202 and 203 are "YES", then it is determined that the engine has started and the generator 1 has started to generate an electrical power so that the program proceeds to Step 205 at which the "subgeneration" indication set in the RAM is reset to indicate the same. Then, at Step 206, the operations of the engine executed in Step 300 and the following routines in FIG. 4 are checked to be done, whereby the rise checking routine 200 is completed.

Figure 6:
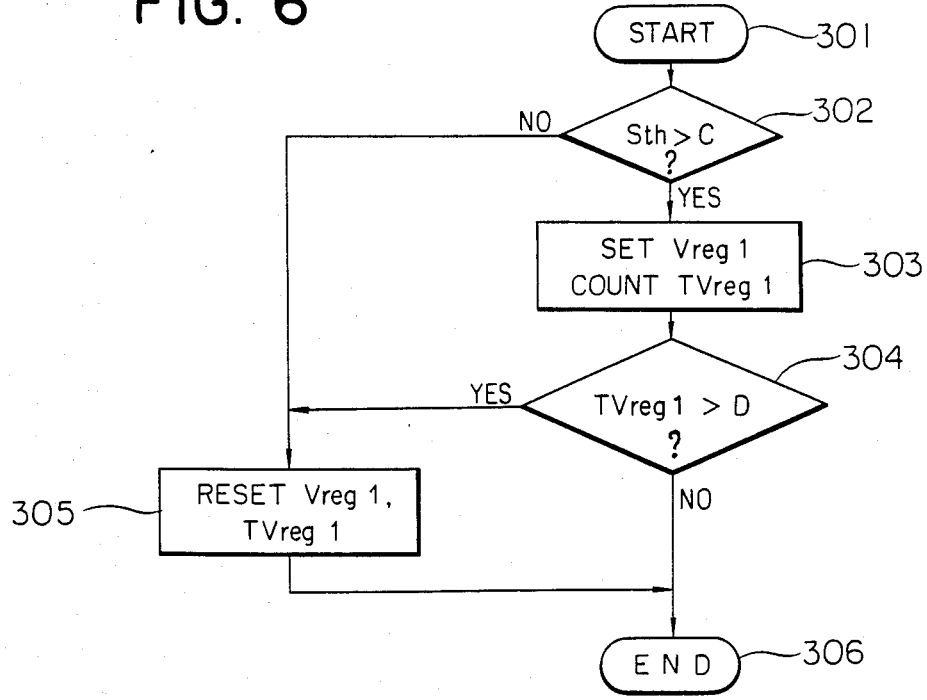
FIG. 6 shows a flow chart of an acceleration checking routine in the general flow chart shown in FIG. 4.

Next, the acceleration checking routine 300 will now be described with reference to FIG. 6. The program proceeds from Step 301 to a throttle opening determining Step 302 at which if the throttle opening Sth exceeds a predetermined value C which is, for example, an accelerator depressed magnitude greater than that in a normal running mode, it is determined that the vehicle is being accelerated so that at Step 303, a demand flag or code Vreg1 for the regulated voltage is set in a corresponding status register in the RAM, and a timer TVreg1 is initiated for counting time elapsed after the flag Vreg1 is set. Then the program proceeds to Step 304 at which it is checked whether TVreg1 exceeds a predetermined time interval D, and if the answer is "NO", then this acceleration checking routine 300 ends while if the answer is "YES", then at Step 305 the demand flag Vreg1 set in the RAM is reset and the timer TVreg1 is also reset, whereby the acceleration checking routine 300 ends.

It is to be noted that Vreg1 at Step 303 indicates a demand for reducing or interrupting the regulated output voltage of the generator 1 as will be described later. This demand flag Vreg1 in turn serves to indicate that the generator 1 is not to generate power and, accordingly does not increase the load on the engine, thereby enhancing the acceleration performance of the vehicle as soon as the vehicle is accelerated. It is also to be noted that the predetermined time interval D at Step 304 defines a time interval (e.g. 60 seconds) for interrupting the output of the generator 1 in order to prevent the battery 2 from being over-discharged.

Figure 7:
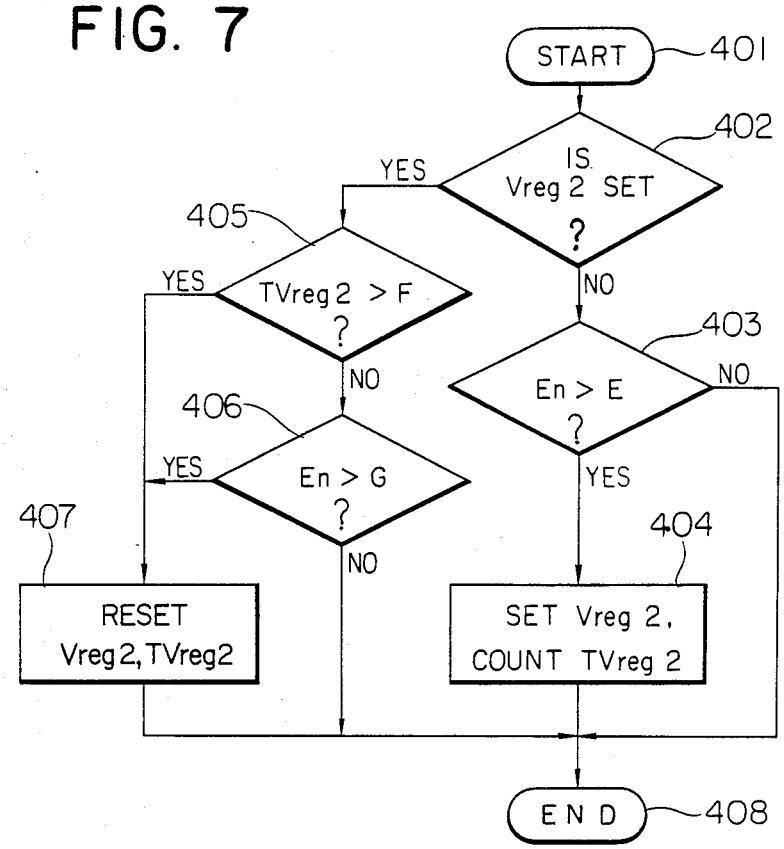
FIG. 7 shows a flow chart of an engine idling stability checking routine in the general flow chart shown in FIG. 4.

Next, the engine idling stability check routine 400 will now be described in detail with reference to FIG. 7. The program proceeds from Step 401 to checking Steps 402 and 403. At Step 402, the status of the register in the RAM as to a demand flag or code Vreg2 for the regulated output voltage of the generator 1 which will be described is checked. At the first stage of the control in FIG. 2, since the RAM is completely initialized, i.e. reset in the above mentioned initializing routine 102, the answer at Step 402 is "NO" and so the program goes to Step 403 at which it is determined whether or not the engine speed En is lower than a predetermined speed value E, whereby it is determined that the idling speed of the engine is unstable. This predetermined value E is preset to a rated lower limit value representative of an idling speed of the engine or a value below which the engine produces uncomfortable vibrations. If it is determined at Step 403 that the idling speed is not unstable, the program ends while if it is determined at Step 403 that the idling speed is unstable, the program proceeds to Step 404 at which the demand flag Vreg2 for the regulated voltage value in the RAM is set and a timer TVreg2 is initiated for counting time elapsed after the flag TVreg2 has been set, after which the program proceeds to END Step 408.

It is to be noted that the flag Vreg2 at Step 404 is a demand for reducing or interrupting the regulated output voltage of the generator 1. This demand in turn serves to eliminate the driving torque of the generator 1 from the load on the engine by controlling the driving portion 15 shown in FIGS. 2 and 3, whereby for example, when the engine is still warming up and the choke valve is closed, the idling speed of the engine is not decreased, and uncomfortable vibrations are suppressed.

When the engine idling stability checking routine 400 is again executed, since it is now determined at Step 402 that the flag Vreg2 in the status register has been already set and therefore the answer is "YES", the program proceeds to Steps 405 and 406 without going to Step 403. This means that the driving torque of the generator 1 does not place a load on the engine, so that the idling speed is not reduced. At Step 405, it is checked as to whether the timer TVreg2 exceeds a predetermined time interval F, and at Step 406, it is checked as to whether the engine speed En exceeds a predetermined speed value G. If the answers at Steps 405 and 406 are "NO", then this routine ends while if the answer at either of Steps 405 and 406 is "YES", then the program proceeds to Step 407 at which Vreg2 in the status register is reset and temporarily stored therein and the timer TVreg2 is also reset, and the routine ends.

It is to be noted that the predetermined time interval F at Step 405 defines a time interval for which the regulated voltage output of the generator 1 is interrupted so that the battery 2 may not be over-discharged for that time interval or longer, and the stability of the idling speed may be again maintained. This time interval is typically preset to e.g. 30 seconds. It is also to be noted that the predetermined speed G at Step 406 defines an engine speed at which the vehicle is just about to start.

Figure 8:
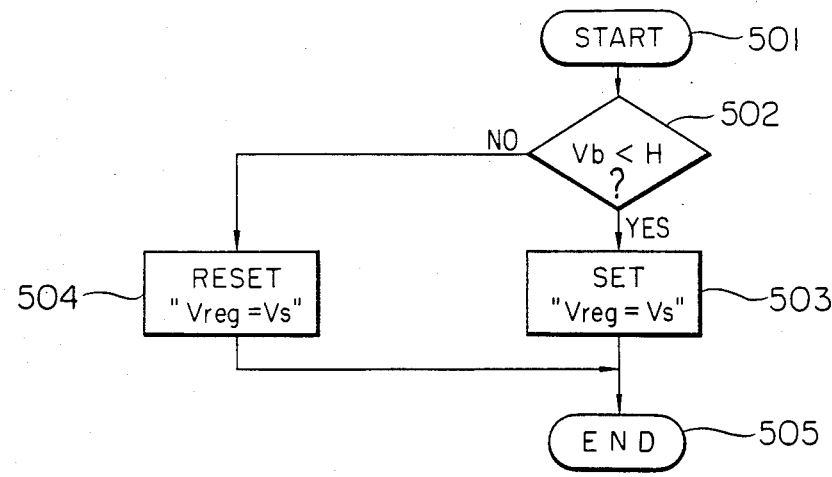
FIG. 8 shows a flow chart of a battery voltage checking routine in the general flow chart shown in FIG. 4.

Next, the battery voltage checking routine 500 will now be described in detail with reference to FIG. 8. The program proceeds from Step 501 to a battery voltage checking Step 502 at which if the battery voltage Vb is lower than a predetermined voltage H which is lower by a constant voltage a1 than a predetermined regulated output voltage Vreg (=Vs or Vs+V1 as will be described later) of the generator 1, it is determined that the battery 2 is in its discharging state. If the answer is "YES", indicating that the battery 2 is discharged, the program proceeds to Step 503 at which a status register in the RAM of "Vreg=Vs" is set as a demand for the regulated output voltage and temporarily stored therein. On the other hand, if the answer at Step 502 is "NO", then at Step 504 the status register of "Vreg=Vs" is reset, and this routine ends.

In this routine, the voltage across the battery 2 is monitored, and when the rotational speed of the generator 1 decreases so that the output of the generator 1 decreases while when the battery voltage becomes lower than the predetermined value H due to the fact that the electrical load 3 of the vehicle in excess of the above regulated output voltage is imposed, it is determined that the battery 2 is being discharged. At this time, the voltage regulated value Vreg output from the generator 1 is assumed to have a basic regulated output voltage Vs which is normally about 14V with respect to the 12V battery, and a time interval during the battery discharge is integrated, and thereafter the battery is re-charged for the integrated time interval as will be described.

Figure 9:
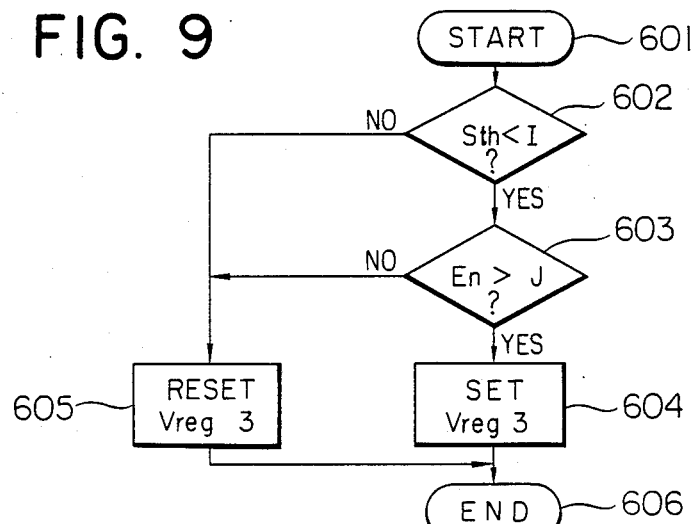
FIG. 9 shows a flow chart of a deceleration checking routine in the general flow chart shown in FIG. 4.

Next, the deceleration checking routine 600 will now be described with reference to FIG. 9. The program proceeds from a start Step 601 to a throttle opening checking Step 602, and an engine speed checking Step 603. At Step 602, it is checked whether the throttle opening signal Sth is lower than a predetermined value I which corresponds to a throttle opening degree indicating an idling state where, for example, the accelerator pedal is not depressed. At Step 603, it is checked whether the engine speed signal En is higher than a predetermined speed J which corresponds to an engine speed in excees of an idling speed when, for example, a cooler in the vehicle is working. If the answers at Steps 602 and 603 are "YES", it is determined that the vehicle is being decelerated, and the program proceeds to Step 604 at which a demand flag Vreg3 in the status register for the regulated output voltage of the generator 1 is set. On the other hand, if the answer at either of Steps 602 and 603 is "NO", it is determined that the vehicle is not in its deceleration mode, and the program proceeds to Step 605 at which the flag Vreg3 is reset, and this routine ends.

It is to be noted that the set state of the demand flag Vreg3 indicates an increase in the driving torque of the generator 1 due to an increased regulated output voltage of the generator 1, so as to assist the braking performance of the vehicle during the deceleration and to recover an electrical energy for the battery 2 by increasing the charging current thereof.

Figure 10:
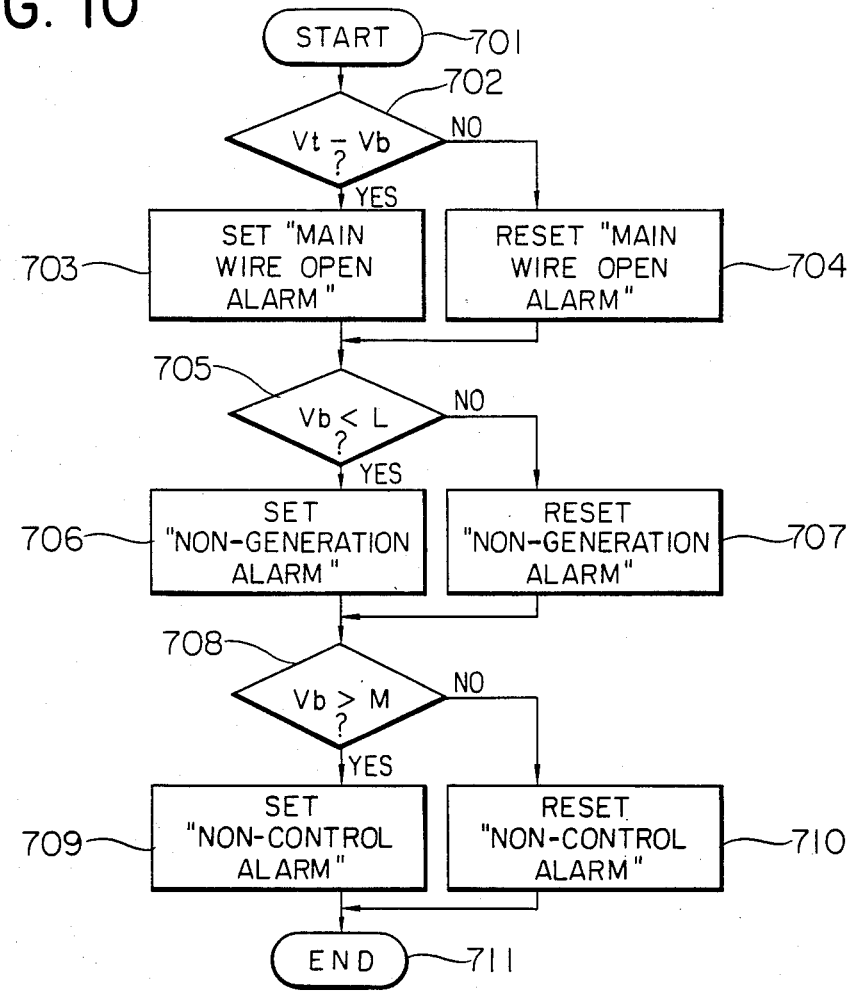
FIG. 10 shows a flow chart of an alarm checking routine in the general flow chart shown in FIG. 4.

Next, the alarm checking routine 800 will now be described in detail with reference to FIG. 10. The program proceeds from a start Step 701 sequentially to a main wire open checking Step 702, a non-generation checking Step 705, and a non-control checking Step 708, whereby malfunctions in the charging system are checked by means of the battery voltages signal Vb and a trio-voltage signal Vt, thereby setting/resetting the corresponding alarm demand status registers.

At first, at Step 702 it is checked whether the main wire or conductor 5 is broken or disconnected at the junction portions. Namely, due to such an open state of the main wire 5, the battery 2 is not charged by the generator 1 whereby a voltage difference arising due to that open state is checked based on a difference between the trio-voltage signal Vt and the battery voltage signal Vb. If Vt−Vb exceeds a predetermined value K, it is determined that the main wire 5 has been open. In this case, the program proceeds to Step 703 at which a status register of the alarm demand regarding "main wire open" is set and temporarily stored whereby an alarm is generated in the alarm output control routine 900. If the main wire is not open, the program proceeds to Step 704 at which a status register of the alarm demand regarding "main wire open is reset. Then, the program proceeds either from Step 703 or 704 to Step 705 at which the battery voltage signal Vb is checked to determine whether the generator 1 is in the non-generation mode. Namely, if the battery voltage Vb is lower than a predetermined voltage value L which is lower by a constant voltage a2 than the predetermined voltage regulated value Vreg, it is determined that the generator 1 is in the "non-generation" condition, and the program proceeds to Step 706 at which a status register of "non-generation" alarm demand is set, whereby an alarm is generated in the routine 900. If the generator 1 is not in the non-generation mode, the program proceeds to Step 707 at which the status register of the "non-generation" alarm demand is reset. Then, from Steps 706 and 707, the program proceeds to Step 708 at which the battery voltage signal Vb is checked to determine whether the generator 1 is in the "non-control" state. Namely, if the battery voltage Vb is higher than a predetermined value M which is higher by a constant voltage b than the regulated voltage value Vreg (Vs or Vs+V1), it is determined that the generator 1 is in the "non-control" state, and the program proceeds to Step 709 at which the status register of the "non-control" alarm demand is set, and then an alarm is generated in the routine 900. If the generator 1 is not in the non-control state, the program proceeds to Step 710 at which the status register of the non-control alarm demand is reset, and then this alarm checking routine ends.

Figure 11:
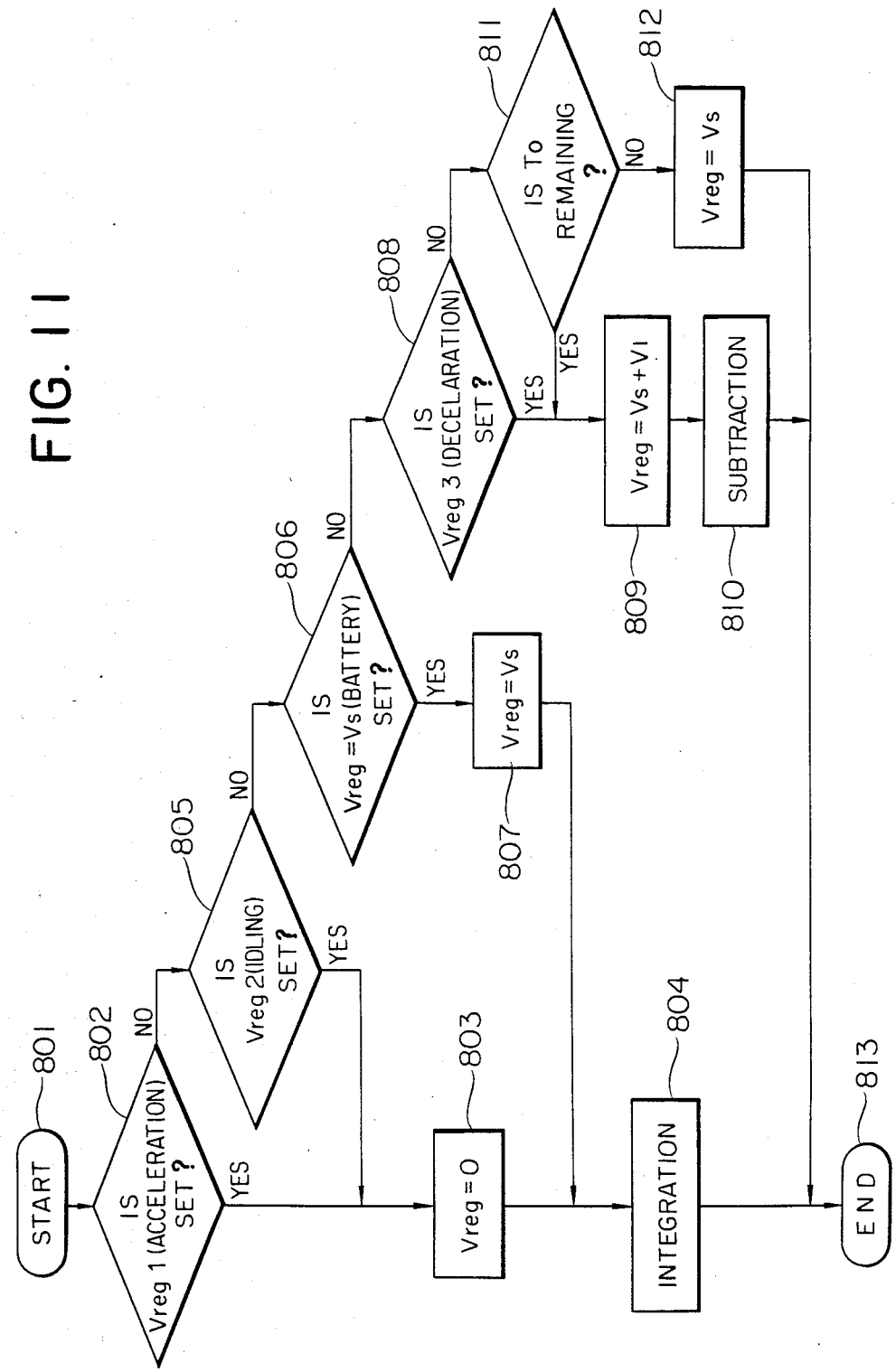
FIG. 11 shows a flow chart of a regulated output voltage control routine in the general flow chart shown in FIG. 4.

Next, the Vreg output control routine 800 will now be described in detail with reference to FIG. 11. The program proceeds from a start Step 801 to Steps 802 and 805. At Step 802, the status of the flag Vreg1 with regard to the acceleration checking routine 300 is checked, and at Step 805, the status of the flag Vreg2 with regard to the engine idling stability checking routine is checked. If at either of Step 802 or 805 the set status is found, the program proceeds to Step 803 at which the regulated output voltage of the generator 1 is rendered zero so that the driving torque of the generator 1 is removed from the load of the engine, whereby the acceleration performance is improved and the idling speed is stabilized. Then the program proceeds to Step 804 at which a time for which the regulated output voltage Vreg is rendered zero as above described is integrated as a time To for an additional charging time interval, and then this routine ends.

It should be noted that at Step 803, Vreg need not necessarily be zero but it can be a value lower than the above mentioned basic regulated voltage Vs, in which case the driving torque can be reduced and the discharge of the battery 2 can be suppressed.

At Steps 802 and 805, if the status register is reset, i.e. the answers are "NO", then the program proceeds to Step 806 at which the status of the register of the RAM in the battery checking routine 500 is checked. If the status register is set, it is determined that the battery 2 is being discharged. Then the program proceeds to Step 807 at which the regulated output voltage Vreg of the generator 1 is rendered the basic regulated voltage Vs. Then the program proceeds to Step 804 at which a time for which the battery 2 is in the discharging mode is also integrated as the above mentioned To for the corresponding additional charging time interval, and then this routine ends. If the answer at Step 806 is "YES" as noted above, it is determined that the battery 2 is in the process of the discharge so that the output of the generator 1 has a reduced level. Therefore, even though Vreg is set to a value higher than Vs, the output of the generator 1 is so insufficient that the regulated output voltage can not be increased. Thus, Verg is not set to such a higher value but to only Vs and waits until the rotational speed of the generator 1 increases. If the answer at Step 806 is "NO", the program proceeds to Steps 808 and 811. At Step 808, the status of the register in the RAM with regard to the deceleration checking routine 600 is checked while at Step 811, the presence/absence of the above noted additional charging time interval To is checked. If the answer at either of Steps 808 and 811 is "YES", the program proceeds to Step 809 at which the regulated output voltage Vreg of the generator 1 is now set to Vs+V1, where V1 is a value sufficient for a rapid charge, to increase the regulated voltage through the driving portion 15. Namely, if the answer at Step 808 is "YES", indicating the deceleration mode of the engine, energy recovery as well as the braking performance of a vehicle are improved while if the answer at Step 811 is "YES", the additional charge for the battery 2 is carried out at Step 809, and Step 810 is executed. At Step 810, the additional charging time interval To is subtracted because the additional charge is being carried out with $Vreg=Vs+V1$ at Step 809 for the time interval To. On the other hand, if both of answers at Steps 808 and 811 are "NO", the program proceeds to Step 812 at which the regulated voltage Vreg of the generator 1 is set to the basis regulated voltage Vs since it has been found that no particular Verg output is demanded through all of the routines 300–600, and then this routine is completed.

As above described, in the Vreg output control routine 800, the status of the register in the RAM with regard to the regulated output voltage in the respective routines is totally checked so that the micro-computer 6 may select an optimum regulated voltage (Vreg=0, Vreg=Vs, $Vreg=V1+V1$) to cause the output circuit 8 to provide a control signal to the driving portion 15, whereby the regulated voltage of the generator 1 can be determined.

Figure 12:
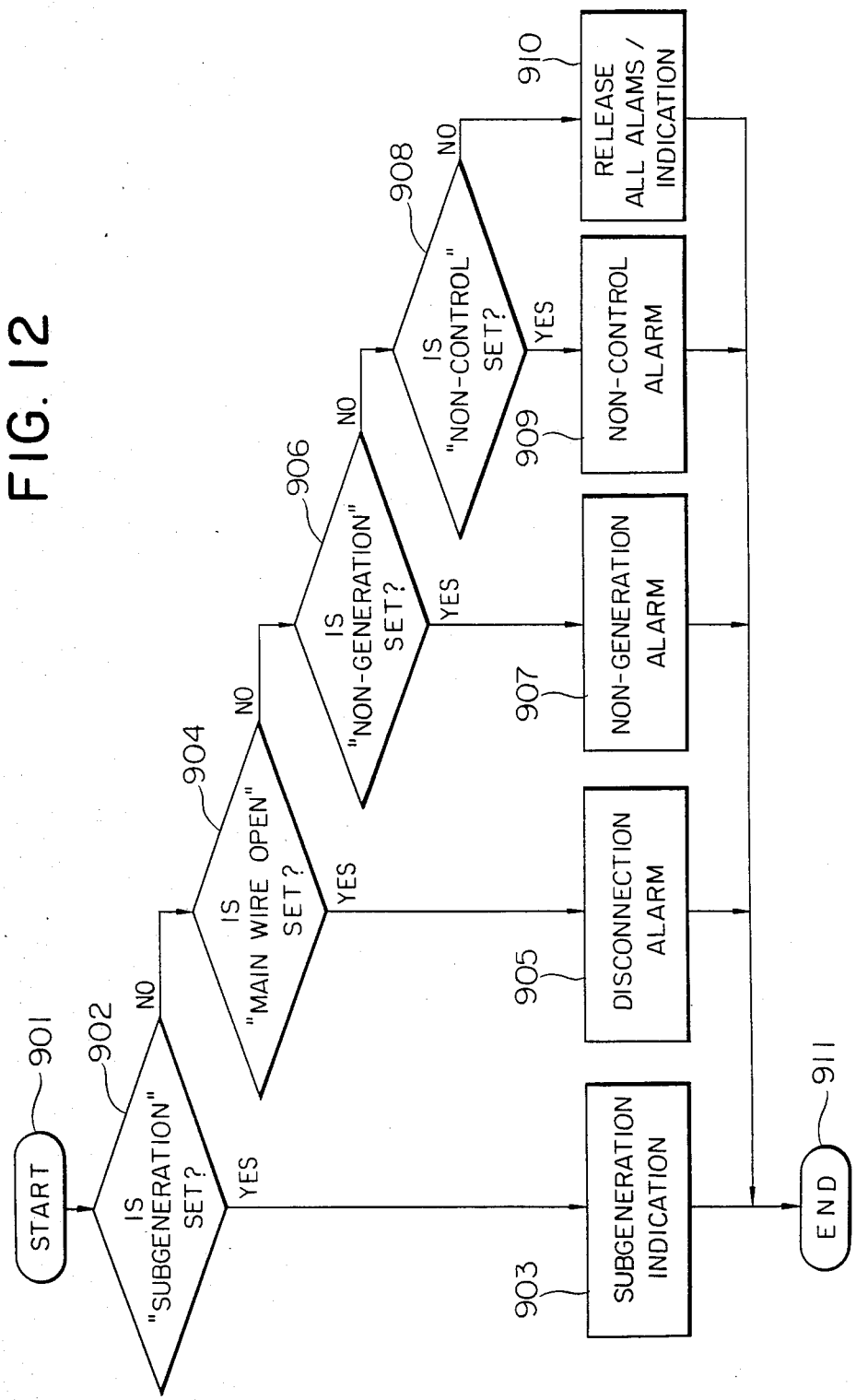
FIG. 12 shows a flow chart of an alarm output control routine in the general flow chart shown in FIG. 4; and, FIG. 13 shows an arrangement diagram of a control apparatus for a vehicular charging generator in accordance with another embodiment of the present invention.

Next, the alarm output control routine 900 will now be described in detail with reference to FIG. 12. The program proceeds from a start Step 901 to a checking Step 902 at which the status of the register in the RAM with regard to "subgeneration" indication in the rise routine 200 is checked and if the answer is "YES", the program goes to Step 903 at which "subgeneration" indication is provided, and the program ends. If the answer is "NO", then the program proceeds to checking Steps 904, 906, and 908 in sequence in order to check the status of the register in the RAM in the routine 200. At Step 904, it is checked whether the status register for alarming "main wire open" is set. If the answer is "YES", the program proceeds to Step 905 at which disconnection alarm is provided, and then the program ends. If at Step 906 it is found that the status register for "non-generation" alarm is set, the program proceeds to Step 907 at which "non-generation" alarm is provided, and the program ends. Furthermore, if at Step 908 it is found that the status register for "non-control" alarm is set, the program proceeds to Step 909 at which "non-control" alarm is provided, and the program ends. If none of the status register at Steps 904, 906, and 908 is set, the program proceed to Step 910 at which all alarms and indication are released, and this routine is completed.

In this alarm output control routine, the status of the registers in the RAM with regard to the alarms in the respective routines are totally checked so that the micro-computer 6 may select an optimum alarm indication to cause the output circuit 8 to drive the alarm portion 9 so that a driver may adequately recognize an optimum alarm.

Thus, since the micro-computer 6 processes, with a high accuracy, the signals from a throttle opening sensor, an engine speed sensor, a battery voltage sensor, and a trio-voltage sensor which are used for the vehicular charging generator, the acceleration/deceleration condition, the idling state, and the battery voltage condition of a vehicle are totally checked to enhance the acceleration performance, to effectively recover the energy of the battery, and to enhance the fuel economy. Also in this case, uncomfortable vibrations during the idling state are eliminated, the discharge of the battery is prevented, and any abnormality in the charging system is indicated to the driver by taking advantage of the above sensors without requiring any additional sensors. These are excellent advantages of the present invention.

It is to be noted that although in the above embodiment, a single micro-computer is used to totally check the output of various sensors to control the regulated output voltage of the generator 1, a plurality of control means may be provided which produce regulated voltages respectively corresponding to the outputs of the sensors for sensing an unstable condition of the engine speed, an acceleration condition, a deceleration condition. Also, only control means for effecting only important control functions may be provided without requiring all of the control functions may be provided.

Namely, according to the first aspect of the present invention, in the case where the rotational speed of the engine is abnormally low such that the rotation is unstable, the power generation of the generator 1 is stopped on the basis of the output of the speed sensor S1 and a time interval for which the power generation is stopped is measured. When the engine has returned to its normal rotational speed, the power generation of the generator 1 is re-started while the regulated output voltage of the generator 1 is temporarily increased for a time interval corresponding to the measured time interval in order to carry out a rapid charge for the recovery of the battery 2. It is to be noted that the time interval for which the generator 1 stops generating may be preset to about 30 seconds and the generator 1 may re-start generating in 30 seconds in which if the rotational speed is still abnormally low even after 30 seconds, the electrical generation by the generator 1 is stopped again. Also, the time interval for which the regulated output voltage is increased for a rapid charge may not coincide with the time interval for which the generator 1 stops generating but may be adjusted according to the capacity of the battery 2.

In the second aspect of the present invention, upon the detection of the acceleration mode of the engine through the output of the throttle opening sensor S2, the power generation of the generator 1 is stopped to reduce the driving torque of the generator, thereby enhancing the acceleration performance of the engine. Also, the time interval for the acceleration mode is measured, and after the acceleration mode is released the generator 1 is operated to provide a regulated voltage higher than a normal one Vs for a rapid charge for a time interval corresponding to the above noted acceleration time interval. It is to be noted that since the battery 2 may be over-discharged if the acceleration mode continues for more than a predetermined time interval such as 60 seconds in the running on a long ascending slope, a highway and so on, timers (TVreg1, TVreg2) as shown in FIGS. 6 and 7 may be provided to re-start the power generation at a normal regulated voltage from the generator 1 when the time interval for which the generator 1 stops generating exceeds the predetermined time interval defined by the timer while continuing the power generation at a regulated voltage higher than the normal one after the completion of the acceleration mode.

In the third aspect of the present invention, on the basis of the outputs of the speed sensor S1 and the throttle opening sensor S2, the deceleration of the vehicle is detected to increase the regulated output voltage of the generator 1.

Figure 13:
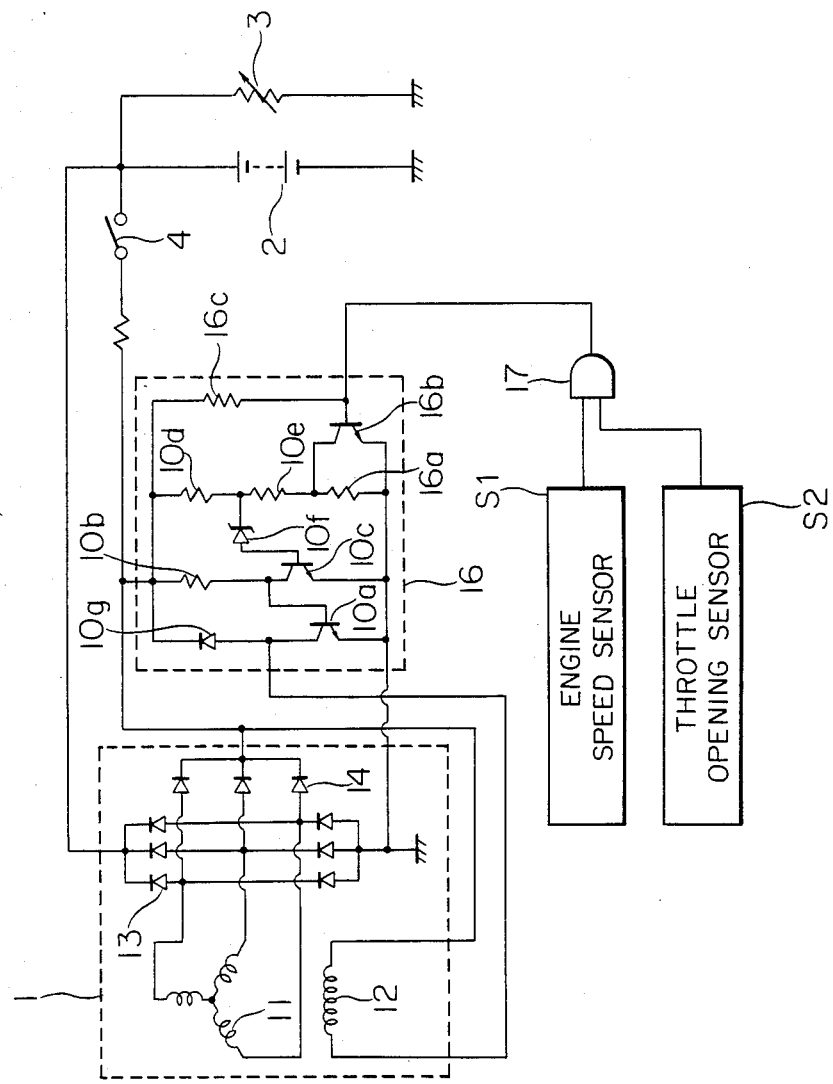

As another embodiment different from the above described embodiment, the inventors of this patent application have conceived what is shown in FIG. 13 wherein in addition to the arrangement of the voltage regulator 10 shown in FIG. 1, a driving portion 16 includes a resistor 16a serially connected to the series combination of the resistors 10d and 10e, and a transistor 16b whose collector and emitter are connected across the resistor 16a and whose base is connected through a resistor 16c to the positive pole of the battery 2. The base of the transistor 16a is also connected to the output of AND gate 17 whose inputs are connected to the engine speed sensor S1 and the throttle opening sensor S2. In this arrangement, during the idling state, the speed sensor S1 provides a low level output while the throttle opening sensor S2 provides a high level output because the accelerator pedal is not depressed at all, so that the AND gate 17 provides a low level output to keep the transistor 16b off. In this situation, when the engine speed is high because of e.g. the engine braking mode in spite of the fact that the accelerator pedal is not depressed at all as above described, both of the sensors S1 and S2 provide high level outputs respectively so that the AND gate 17 causes the transistor 16b to be switched on to shortcircuit the resistor 16a. Therefore, the junction voltage between the voltage dividing resistors 10d and 10e lowers, thereby keeping the regulated output voltage of the generator 1 at a voltage higher than the normal voltage Vs. Accordingly, as the regulated output voltage of the generator 1 increases, the charging current into the battery 2 also increases so that the braking energy in the deceleration mode can be effectively recovered for the battery 2, and simultaneously the current flowing through the electrical load 3 also increases so that the output current from the generator 1 is increased, whereby the driving torque of the generator 1 is also increased, resulting in a large braking force.

In the fourth aspect of the present invention, an overloaded condition is detected due to the reduction of the terminal voltage of the battery 2 while the time interval for the overloaded state is measured. After the overloaded state is released, the regulated output voltage of the generator 1 is increased for a time interval corresponding to the time interval measured as above so that the battery 2 may be rapidly charged.

Furthermore, in the fifth aspect of the present invention, in response to the outputs of various sensors, various conditions are determined correspondingly, whereby an adequate alarm is delivered to a driver.

As above described, it is quite advantageous according to the present invention in that the rotational speed of an engine is stabilized, the acceleration/deceleration performance is improved, the capacity of the battery is maintained, and alarms are provided to indicate in abnormal conditions.

It is to be noted that while the present invention has been described with reference to the above embodiments illustrated in the accompanying drawings, it should not be limited to them and may be applied with various modifications thereof without departing from the spirit of the invention.

What we claim is:

1. A control apparatus for a vehicular charging generator driven by an engine and for supplying electrical power to a battery and electrical loads comprising:
   a driving portion for controlling the field current of said genrator to regulate the output voltage of said generator;
   at least one sensing means for sensing a predetermined operating condition of said engine and for generating an output representative thereof; and
   control means for controlling said driving portion by determining said operating condition of said engine according to the output of said sensing means, said control means causing said generator to stop the power generation when the output of said sensing means indicates the predetermined operating condition including at least one of an underspeed rotation condition, an acceleration condition, and an overload condition of said engine, and for temporarily increasing the regulated ouput voltage of said generator as compared with a normally regulated voltage thereof for a predetermined period after said sensing means have not sensed the predetermined condition to compensate for battery overdischarge.

2. A control apparatus for a vehicular charging generator driven by an engine and for supplying electrical power to a battery and electrical loads comprising:
   a driving portion for controlling the field current of said generator to regulate the output voltage of said generator;
   sensing means for sensing the rotational speed of said engine; and,
   control means for stopping the power generation of said generator by determining that said rotational speed is lower than a predetermined speed according to the output of said sensing means; said control means measuring a time interval for which said generator stops generating and controlling said driving portion so that the output voltage of said generator is made higher than a normally regulated voltage thereof for a time interval having as a parameter said measured time interval when said rotational speed becomes higher than said predetermined speed.

3. A control apparatus for a vehicular charging generator as claimed in claim 2 wherein said control means re-starts the power generation of said generator at said normally regulated voltage if said measured time interval is longer than a predetermined time interval, and controls said driving portion so that said genrator again stops generating if said rotational speed of said engine is still lower than said predetermined speed.

4. A control apparatus for a vehicular charging generator driven by an engine and for supplying electrical power to a battery and electrical loads comprising:
   a driving portion for controlling the field current of said generator to regulate the output voltage of said generator;
   sensing means for sensing the acceleration condition of said engine; and,
   control means for controlling said driving portion so that said field current is suppressed to restrict the regulated output voltage of said generator when said sensing means senses said acceleration condition; said control means measuring a time interval for which the output voltage of said generator is restricted and controlling said driving portion so that the regulated output voltage of said generator is made higher than a normally regulated voltage thereof for a time interval having as a parameter said measured time interval after said sensing means has not sensed said acceleration condition.

5. A control apparatus for a vehicular charging generator as claimed in claim 4 wherein said control means controls said driving portion so that said suppression of said field current is stopped in a predetermined time interval while said sensing means senses said acceleration condition.

6. A control apparatus for a vehicular charging generator driven by an engine and for supplying electrical power to a battery and electrical loads comprising:
   a driving portion for controlling the field current of said generator to regulate the output voltage of said generator;
   first sensing means for sensing the rotational speed of said engine;
   second sensing means for sensing the deceleration condition of said engine; and,
   control means for controlling said driving portion so that the regulated output voltage of said generator is made higher than a normally regulated voltage thereof when said rotational speed is higher than a predetermined speed and also said engine is in said deceleration condition.

7. A control apparatus for a vehicular charging generator as claimed in claim 6 wherein said second sensing means senses the throttle opening of said engine whereby said second sensing means senses said deceleration condition when said throttle opening is below a predetermined degree.

8. A control apparatus for a vehicular charging generator driven by an engine and for supplying electrical power to a battery and electrical loads comprising:
   a driving portion for controlling the field current of said generator to regulate the output voltage of said generator;
   sensing means for sensing the terminal voltage across said battery; and,
   control means for measuring a time interval for which said terminal voltage is lower than a predetermined voltage and for controlling said driving portion so that the output voltage of said generator is made higher than a normally regulated voltage thereof for a time interval having as a parameter said measured time interval when said terminal voltage has returned to said predetermined voltage or more.

9. A control apparatus for a vehicular charging generator driven by an engine and for supplying electrical power to a battery and electrical loads comprising:
   a driving portion for controlling the field current of said generator to regulate the output voltage of said generator;
   a throttle opening sensor means for sensing the throttle opening of said engine and for generating an output representative thereof;

an engine speed sensor means for sensing the rotational speed of said engine and for generating an output representative thereof;

a battery voltage sensor means for sensing the voltage across said battery and for generating an output representative thereof;

a trio-voltage sensor means for sensing the trio-voltage of said charging generator and for generating an output representative thereof; and control means for controlling said driving portion to stop the power generation of said generator responsive to at least one of an acceleration condition, a deceleration condition, an idling condition of said engine, and a charging condition of said battery based on the outputs of said sensor means, and for temporarily increasing the regulated output voltage of said generator as compared with a normally regulated voltage thereof for a predetermined period after said sensing means have not sensed at least one of the conditions to compensate for battery overdischarge.

10. A control apparatus for a vehicular charging generator as claimed in claim 9 further including an alarm means for detecting and indicating an abnormal condition of said engine from the outputs of said sensors.

* * * * *